(12) United States Patent
Schmitz

(10) Patent No.: US 6,269,794 B1
(45) Date of Patent: Aug. 7, 2001

(54) METHOD OF STABILIZING THE IDLING RUN OF AN INTERNAL-COMBUSTION ENGINE

(75) Inventor: Günter Schmitz, Aachen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/328,462

(22) Filed: Jun. 9, 1999

(30) Foreign Application Priority Data

Jun. 9, 1998 (DE) ............................... 198 25 729

(51) Int. Cl.$^7$ ............................. F02D 41/16; F02D 13/08; F01L 1/34
(52) U.S. Cl. .................. 123/339.14; 123/316; 123/90.11
(58) Field of Search ..................... 123/339.11, 339.14, 123/339.16, 339.17, 339.18, 90.11, 90.15, 90.16, 90.17, 316

(56) References Cited

U.S. PATENT DOCUMENTS

| | | | |
|---|---|---|---|
| 4,917,058 | * | 4/1990 | Nelson et al. ..................... 123/90.17 |
| 5,765,514 | * | 6/1998 | Sono et al. ........................ 123/90.11 |
| 5,765,528 | * | 6/1998 | Kamimaru ........................ 123/90.11 |
| 5,894,828 | * | 4/1999 | Sivashankar et al. .......... 123/339.11 |
| 5,996,552 | * | 12/1999 | Iijima et al. ..................... 123/339.16 |

* cited by examiner

*Primary Examiner*—Willis R. Wolfe
(74) *Attorney, Agent, or Firm*—Venable; Gabor J. Kelemen

(57) ABSTRACT

A method of regulating the idling run of an internal-combustion engine having a crankshaft, a plurality of cylinders each provided with intake and exhaust valves, a piston received for reciprocation in each cylinder and an engine control for variably controlling the intake and exhaust valves. The method includes the following steps during the idling run: determining the opening moment of the intake valves as a function of the angular position of the crankshaft and determining the closing moment of the intake valves by the engine control as a function of time.

5 Claims, 2 Drawing Sheets

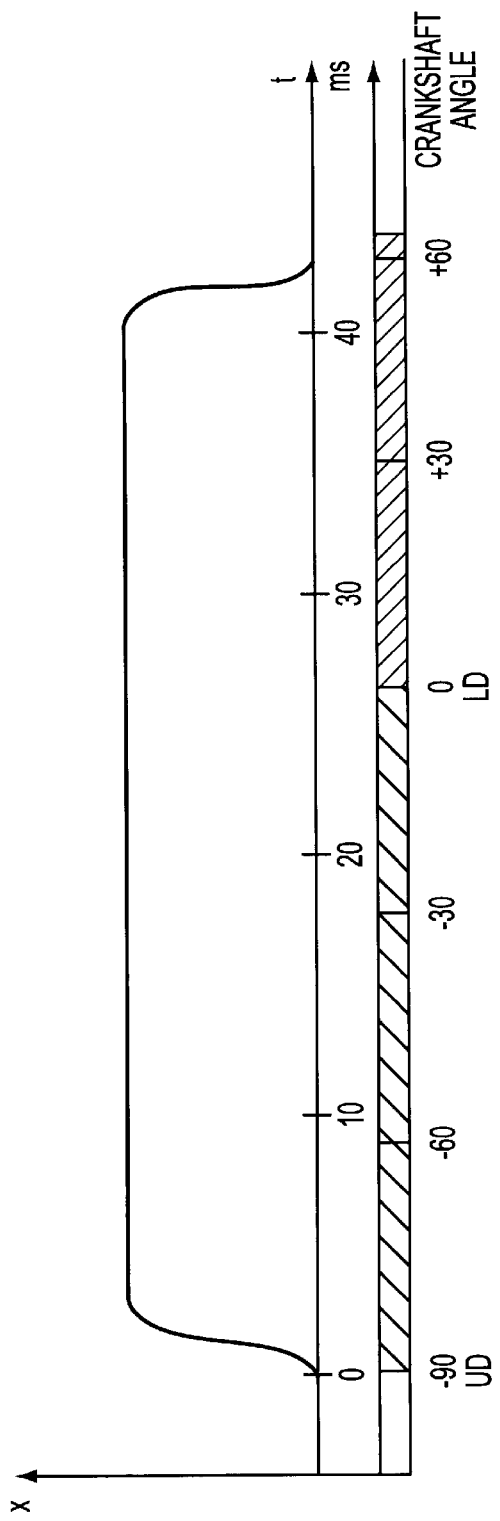
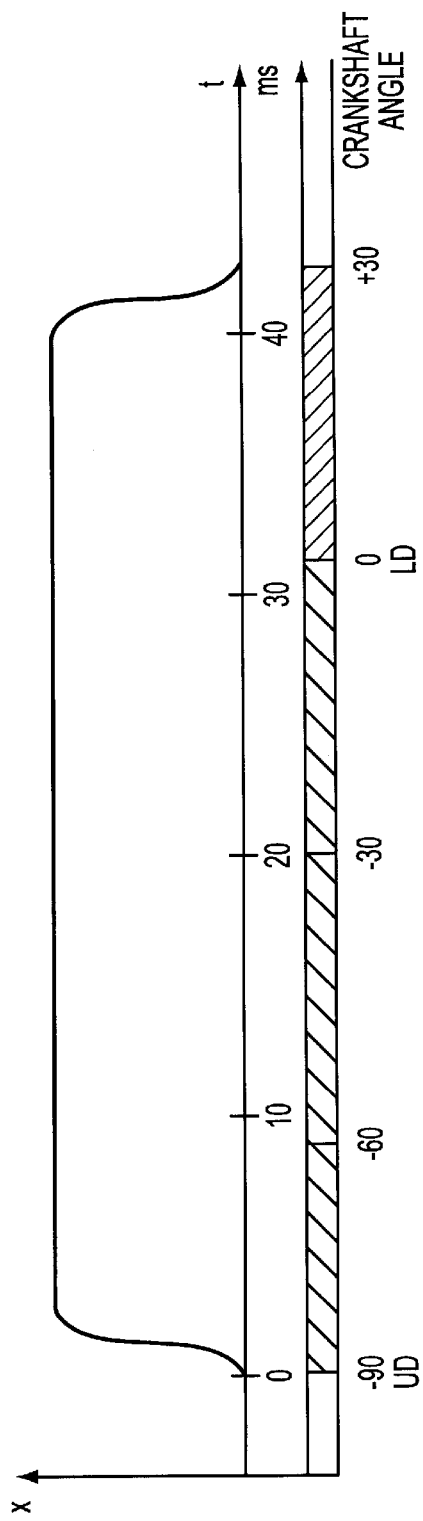
FIG. 1
FIG. 2

METHOD OF STABILIZING THE IDLING RUN OF AN INTERNAL-COMBUSTION ENGINE

CROSS REFERENCE TO RELATED APPLICATION

This application claims the priority of German Application No. 198 25 729.5 filed Jun. 9, 1998, which is incorporated herein by reference.

BACKGROUND OF THE INVENTION

In piston-type internal-combustion engines which operate with conventionally controlled cylinder valves and in which the load control is effected by a butterfly valve, controlling the air quantities for adjusting the idling run may be effected by the butterfly valve. A different method for (stabilizing) the idling run must be found, however, for piston-type internal-combustion engines having a throttle-less load control, particularly internal-combustion engines which have fully variably controllable cylinder valves, such as cylinder valves which are operated by electromagnetic drives.

SUMMARY OF THE INVENTION

Accordingly, it is an object of the invention to provide a method for stabilizing the idling run in throttle-less internal-combustion engines.

This object and others to become apparent as the specification progresses, are accomplished by the invention, according to which, briefly stated, the method of stabilizing the idling run of an internal-combustion engine includes the following steps during the idling run: determining the opening moment of the intake valves as a function of the angular position of the crankshaft and determining the closing moment of the intake valves by the engine control as a function of time.

In fully variably controllable cylinder valves such as cylinder valves operated by electromagnetic valve drives, very low idling rpm's (even less than 500) may be set. It is of importance, however, that in case of an rpm drop, a rapid reaction of the engine control occurs for preventing a stalling of the engine. The method according to the invention as outlined above provides for a particularly rapidly reacting idling control in case the engine control provides for a "delayed intake-closing" operation. In such a mode of operation, in case of an rpm drop, an automatic shift of the closing moment towards an earlier crankshaft angle occurs, so that a larger quantity of air and thus a larger mixture charge is introduced into the cylinder. It is an advantage of such an idling stabilization that a latest possible reaction to the rpm drop takes place.

According to an advantageous feature of the invention, if the engine rpm falls below a predetermined minimum rpm in an "early intake-closing" operational mode, the engine control lengthens the open period of the gas intake valves. In case of such a control too, a rapid reaction may take place upon recognition of an rpm drop. Such a lengthening of the open period may be effected either by a shift of the closing moment or, according to another feature of the invention, by opening the gas intake valve for a second time during the suction stroke.

According to a variant, in case the engine-rpm drops below a predetermined minimum rpm, instead of or in addition to a change of the valve closing moment, the timing of fuel injection is altered for enriching the mixture, to thus adjust the fuel quantity to be supplied. This may be effected either by lengthening the fuel injection period, that is, more fuel is supplied, or the moment of fuel injection is shifted such that it occurs subsequent to the closing of the intake valve. In this manner an "automatic" enriching is achieved which additionally assists in compensating for the rpm drop. In the last-discussed method, however, the fuel quantity for the subsequent work cycle of the respective cylinder has to be again increased in order to compensate for the fuel component delivered during the preceding work cycle. Such a result may be achieved, for example, by providing for an earlier injection. In either case it is avoided that the introduced air renders the mixture leaner.

In case the engine control is set to an "earlier intake-closing" operation, upon recognizing an rpm drop, the engine control may switch over to the "late intake-closing" mode, so that the earlier-described "automatic" idling run stabilization is obtained.

BRIEF DESCRIPTION OF THE DRAWINGS

FIG. 1 is a diagram illustrating a "late intake-closing" operational mode, showing the timing of the valve opening, related to the crankshaft angle, in case of a constant idling rpm.

FIG. 2 illustrates the mode of operation according to FIG. 1, showing the timing of the valve opening, related to the crankshaft angle, in case of an rpm drop.

DESCRIPTION OF THE PREFERRED EMBODIMENTS

Figure 3:
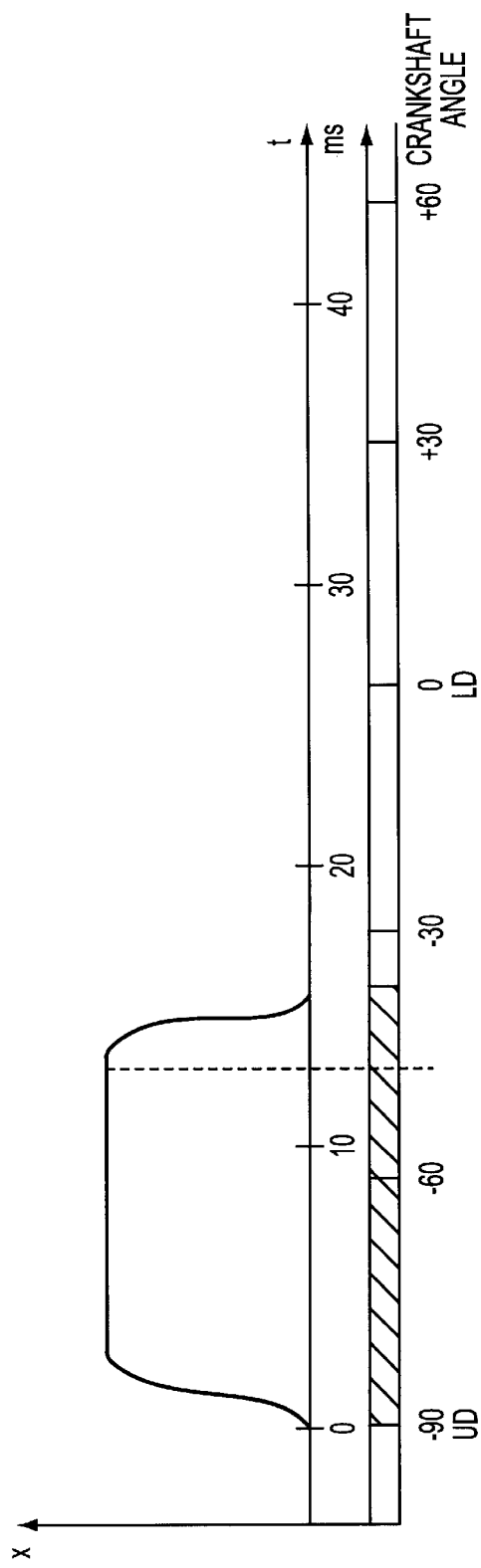
FIG. 3 is a diagram illustrating an "early intake-closing" operational mode, showing the timing of the valve opening, related to the crankshaft angle, in case of a constant idling rpm.
Figure 4:
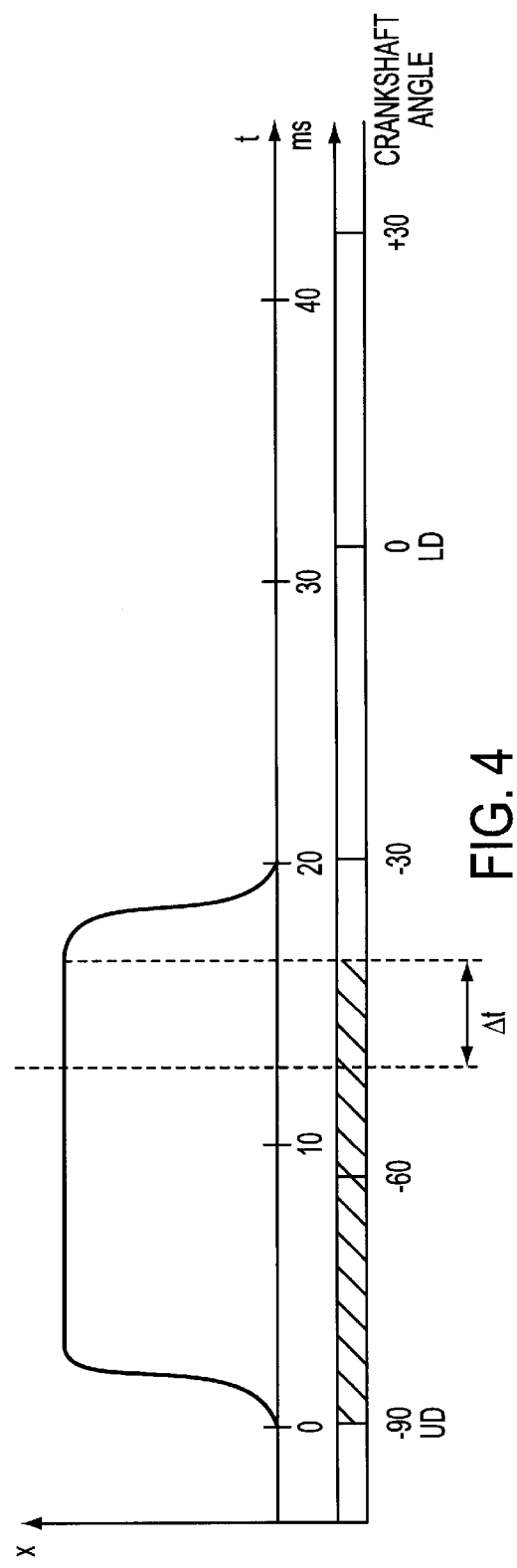
FIG. 4 illustrates the mode of operation according to FIG. 3, showing the timing of the valve opening, related to the crankshaft angle, in case of an rpm drop.

FIG. 1 illustrates the stroke of an intake valve as a function of time; for the sake of illustration the relationships are shown in approximation. The axis extending below the time axis illustrates the momentary crankshaft angle. The opening motion of the intake valve is initiated by the engine control as a function of the crankshaft angle, for example, when the piston in the respective cylinder reaches its upper dead center. That moment is designated at 0 on the time axis which has a scale in milliseconds. In case the intake valve is operated by an electromagnetic actuator, at a low rpm of 600, a relatively steep rise of the valve stroke x is obtained. Consequently, the fully open cross section of the intake port is reached approximately after 3 ms.

While conventionally the engine control continues to determine the closing moment of the valve as a function of the crankshaft angle, according to the method of the invention the engine control is switched over to a time-dependent valve closing. The valve closing process is initiated approximately 40 ms after the valve opening process is started.

Comparing the valve stroke curve with the crankshaft angle axis divided in crankshaft degrees, it is seen that in case of a constant rpm, equidistant sectors for the crankshaft angle are obtained in relation to the time axis. Thus, as the piston moves downward, a suction phase from the upper dead center (UD) to the lower dead center (LD) is obtained which corresponds to a time period of approximately 25 ms following the opening of the intake valve. Since, independently from the crankshaft position the intake valve is maintained open beyond the lower dead center, the piston, during its upward motion, drives the excessively drawn mixture back into the intake port, for example, until about 60° of crankshaft angle after reaching the lower dead center.

If during the idling run an rpm drop occurs then, as shown in FIG. 2, while the open period of the intake valve remains the same, a lengthening of the crankshaft angle sectors traveled by the crankshaft during the open period of the intake valve occurs. In such a situation, for example, during the first 30° of the crankshaft angle following the upper dead center the rpm remains at 600. Due to the subsequent rpm drop, the adjoining crankshaft angle sectors expand relative to the time axis. Combustion mixture, however, continues to be drawn until the piston reaches its lower dead center; thereafter the mixture is driven back into the intake port. Because of the reduced rpm, the lower dead center is reached later, for example, only after approximately 28 ms. Since, however, the engine control as in FIG. 1—maintains the intake valve open, upon closing of the intake valve, a crankshaft angle position of only approximately 35° is reached after the lower dead center, so that the piston, although it has passed the lower dead center, can drive only a small quantity of mixture into the intake port in the remaining open period of the intake valve. As a result, there is obtained, compared to a control which is dependent from the crankshaft angle, a significantly larger quantity of fresh mixture which remains in the combustion chamber, so that after the closing of the intake valve in the consecutive work stroke, despite the rpm drop, sufficient power is applied to the crankshaft so that the latter is again accelerated and thus the rpm drop may be equalized.

In case of a "late intake-closing" determined by the engine control, it may be expedient not to switch over immediately to a time control following the opening of the intake valve as a function of the crankshaft angle but to effect such an event at a later moment, that is, for a later crankshaft angle.

FIG. 3 shows in a similar manner the conditions for a "early intake-closing" operational mode. The stroke curve shows the course of the valve stroke of the intake valve in case of a constant idling rpm. The intake valve is opened, for example, when the piston has reached the upper dead center and is closed a short time later, for example, at 45° of crankshaft position after the upper dead center.

When an rpm drop occurs, then, in case of a crankshaft-angle dependent control the open period of the intake valve is lengthened by Δt. Since, however, the valve closes in the same position of the piston, no increase of the fill extent (charge) and thus no power increase occur. For this reason the open period for the intake valve has to be lengthened over a large crankshaft angle sector and the intake valve has to be closed at a later moment, so that more air may be admitted in the combustion chamber.

Since the fuel quantity has been metered by the injection system with respect to the originally intended air quantity, by means of the extension of the open period a leaner mixture would result which is contrary to the desired increase of the torque. For this reason it is expedient to shift the injection phase in such a manner that the injection of the fuel occurs during the closing of the intake valve. In this manner, any shift of the closing moment in the "late" direction automatically effects an injection of a more than proportionally higher fuel quantity. Such an enrichment may additionally serve to increase the torque applied to the crankshaft. In this manner sometimes the cause for the rpm drop is counteracted as well. In cold engine conditions the cause may be found precisely in a poorly combustible mixture. Instead of a shift of the injection phase or a change in the opening period of the intake valve, it is feasible, based on a detected rpm drop, to inject additional fuel to thus counteract the rpm drop by enriching the mixture.

Instead of an extension of the open period of the intake valve, the control in case of fully variably controllable cylinder valves may be effected such that after the program-wise intended "early" closing of the intake valve, the latter is opened briefly once more during the suction stroke in order to draw additional air and/or a fresh mixture into the cylinder.

The above-described method may be utilized in piston-type internal-combustion engines with one or with several intake valves in which case either both intake valves are synchronously controlled in accordance with a predetermined process or one of the intake valves remains fully closed and only the other intake valve operates.

The method according to the invention is utilized preferably in piston-type internal-combustion engines operating with electromagnetically actuated cylinder valves. The invention, however, may also find application in other types of fully variable cylinder valve operations, for example, where the valves are hydraulically actuated.

It will be understood that the above description of the present invention is susceptible to various modifications, changes and adaptations, and the same are intended to be comprehended within the meaning and range of equivalents of the appended claims.

What is claimed is:

1. A method of stabilizing the idling run of an internal-combustion engine having a crankshaft, a plurality of cylinders each provided with intake and exhaust valves, a piston received for reciprocation in each cylinder and an engine control for variably controlling the intake and exhaust valves, comprising the following steps during the idling run:
   (a) opening the intake valves at a moment determined as a function of the angular position of the crankshaft and
   (b) closing the intake valves by the engine control at a moment determined as a function of time, whereby if an actual rpm exceeds a predetermined desired rpm, one part of a charge is returned from the cylinders into respective intake ports and if the actual rpm falls below the predetermined desired rpm, an increase of the charge in the cylinders is effected, without varying the open period between opening and closing moments as defined in steps (a) and (b).

2. The method as defined in claim 1, further comprising the step of shifting the closing of the intake valves to a moment after the respective piston has passed a lower dead center following a suction stroke.

3. The method as defined in claim 1, further comprising the steps of controlling the intake valves in an early intake-closing operational mode and lengthening an open period of the intake valves by the engine control when the idling engine-rpm falls below a predetermined magnitude.

4. The method as defined in claim 3, further comprising, during the open state of the intake valves, the steps of detecting the engine-rpm and changing the timing of fuel injection for enriching the combustion charge when the engine-rpm falls below a predetermined magnitude.

5. The method as defined in claim 3, wherein the lengthening step comprises the step of a repeated opening of the intake valve during the suction strokes.

* * * * *